Figure 1:
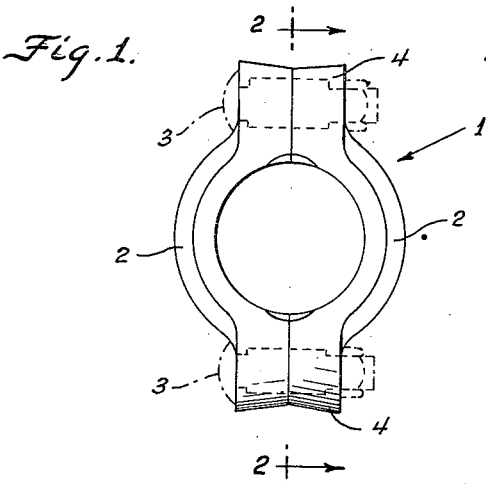

Sept. 18, 1962  E. W. PIATEK  3,054,629
PIPE COUPLINGS

Filed Sept. 4, 1958  3 Sheets-Sheet 1

INVENTOR.
EDWARD W. PIATEK
BY
ATTORNEY.

Sept. 18, 1962  E. W. PIATEK  3,054,629
PIPE COUPLINGS
Filed Sept. 4, 1958  3 Sheets-Sheet 2
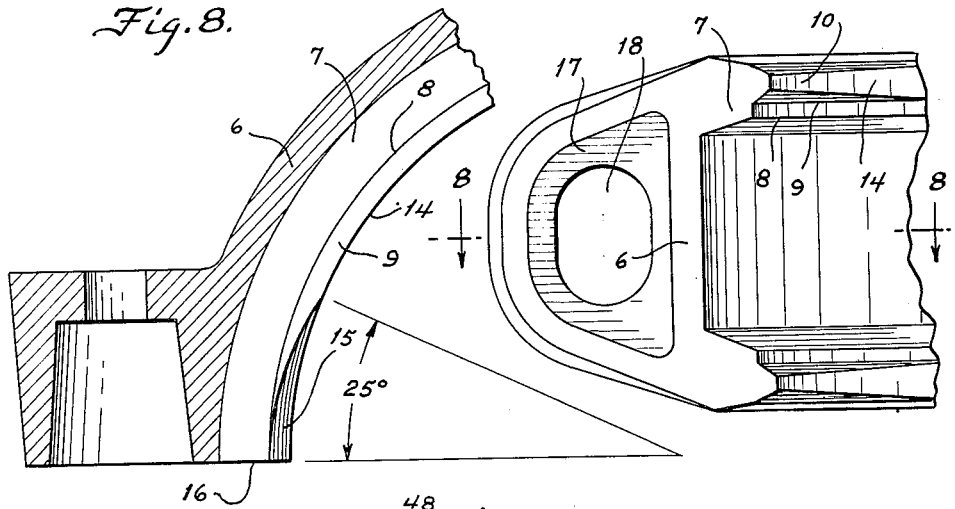
Fig. 8.
Fig. 7.
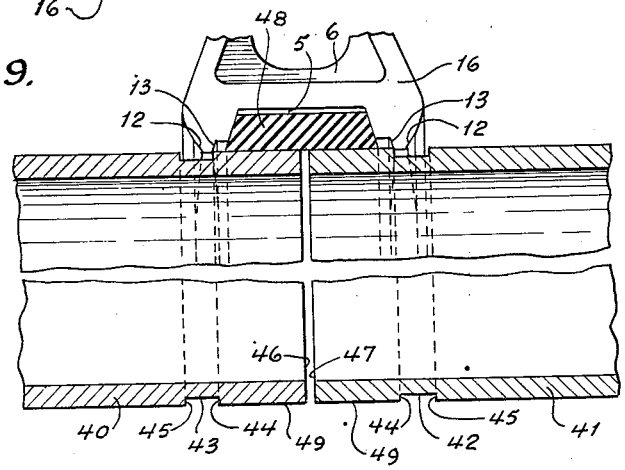
Fig. 9.
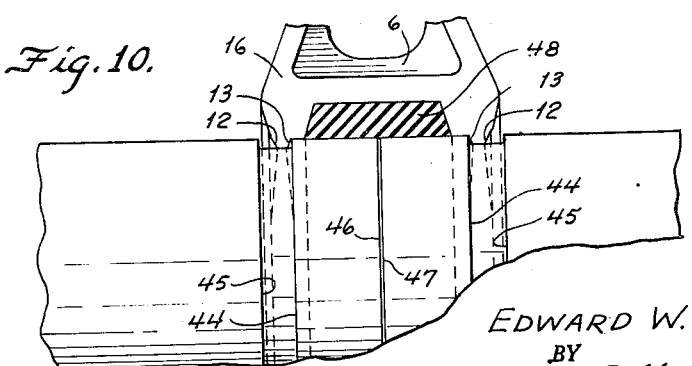
Fig. 10.
INVENTOR.
EDWARD W. PIATEK
BY
Albert M. Parker
ATTORNEY.

Sept. 18, 1962   E. W. PIATEK   3,054,629
PIPE COUPLINGS

Filed Sept. 4, 1958   3 Sheets-Sheet 3

INVENTOR.
EDWARD W. PIATEK
BY
Albert M. Parker
ATTORNEY.

United States Patent Office 3,054,629
Patented Sept. 18, 1962

3,054,629
PIPE COUPLINGS
Edward W. Piatek, Linden, N.J., assignor to Victaulic Company of America, Union, N.J., a corporation of New Jersey
Filed Sept. 4, 1958, Ser. No. 758,971
1 Claim. (Cl. 285—373)

This invention relates to pipe couplings for the coupling of sections of grooved end pipe and is more particularly concerned with facilitating the application of the housings of such couplings to grooved end pipe.

Following the issuance of the patent to Tribe #1,541,-601 dated June 9, 1925, the art of coupling pipes by grooving the exteriors thereof adjacent their ends, applying a pressure responsive gasket overlapping portions of the opposed ends and encompassing such gasket with coupling housings having key sections for engagement in the grooves, became generally adopted as a highly effective manner for the quick coupling and uncoupling of pipe sections. The ends of the pipe did not need to be brought tightly together for the properly housed gasket took care of preventing leakage. Thus, a certain flexibility was possible at the joints by dimensioning the key section slightly under the dimensions of the width of the grooves formed in the pipe. This is still a most effective method of pipe coupling and is used very extensively.

Special conditions have arisen, however, in the coupling of pipes where further provision is needed to enable the workmen to apply the housings to the pipes without the necessity of having to feel for the grooves and move the coupling housings or the pipe around in order to get the key sections of housings into engagement with the grooves. As non-limiting examples of these situations are those where non cavity gaskets, or solid ones, as against the relatively hollow gaskets of Tribe, are employed; where special gasketing between the ends of the pipes is needed in such instances as where corrosion is a factor; and generally where the ends of the pipe are not together and thus the grooves are not initially in the desired position. Under such and other pertinent circumstances time is lost by the workmen in applying the coupling housings which, save for the instant invention, could develop into a deterrent against the continuation of the favorable response of industry to this general type of coupling.

The instant invention eliminates any such possible deterrent and does so in a simple and effective manner. By the adoption of the invention not only is the coupling of pipes facilitated so as to overcome the foregoing deterrents but coupling of grooved pipes generally is enhanced and speeded up. This achievement is attained by the provision of suitable "lead in," elements on coupling housings, to be described in detail hereinafter.

It is, accordingly, a principal object of this invention to improve upon the application of coupling housings to grooved end pipes for the effecting of improved joints between pipe ends.

Another object is to effect such improvement in simple economical manner.

Still another object is to improve upon the mating of housing keys with the receiving grooves therefore in the pipes.

A further object is to improve upon such mating in respect of dimensional tolerances of key sections, coupling and pipe tolerances.

A still further object is to enable that mating to be easily effected regardless of the experience, or lack of it of the operator effecting the joint.

A more particular object is to enable such mating to be effected without more than a cursory view of the key ends by the operator, without concern for the correct mating of the parts not exposed to view.

Further and more detailed objects of the invention will in part be obvious and in part be pointed out as the description of the invention taken in conjunction with the accompanying drawing proceeds.

Figure 2:
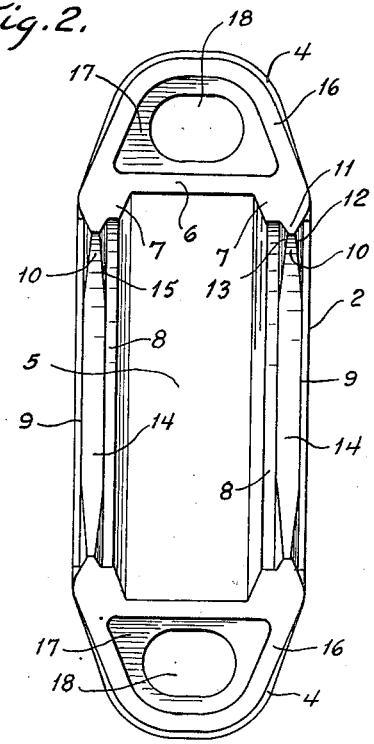
Figure 3:
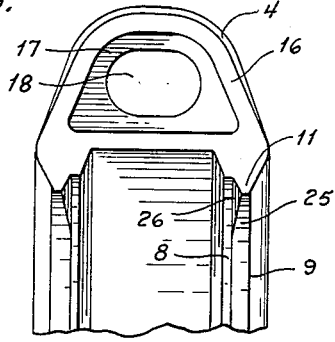
Figure 4:
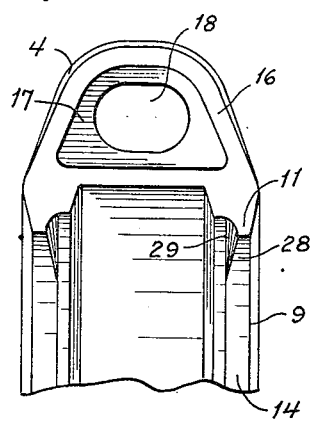
Figure 5:
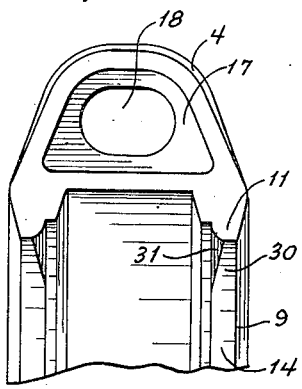
Figure 6:
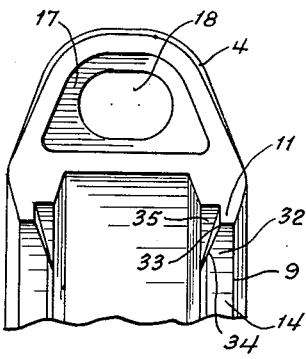
Figure 11:
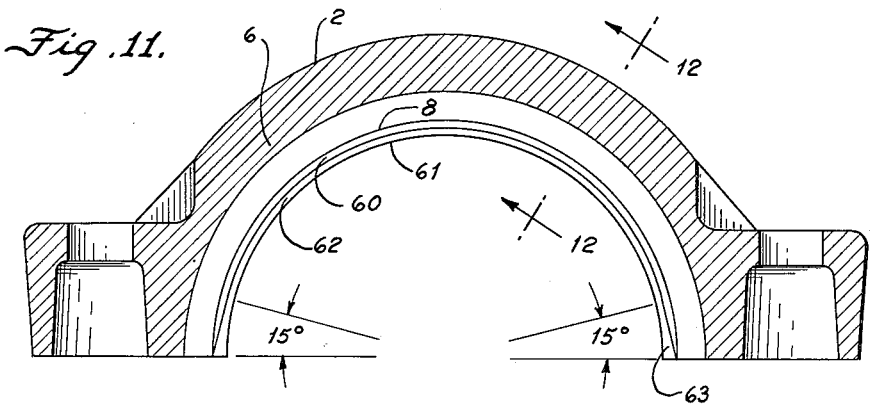
Figure 12:
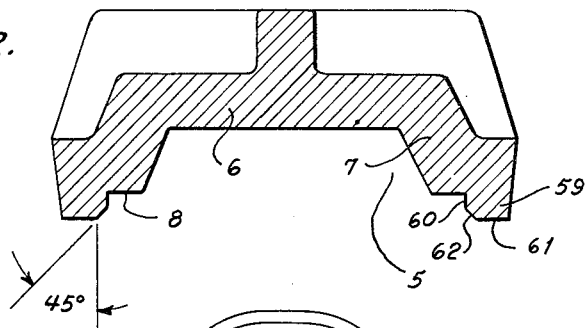
Figure 13:
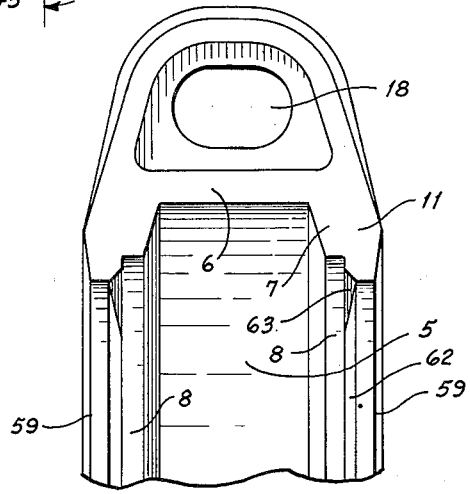

In that drawing:
FIG. 1 is an elevational view of a pair of coupling housings in accordance with the preferred form of the invention showing such housings as assembled together;
FIG. 2 is an enlarged interior view of one of the housings of the preferred form of FIG. 1;
FIG. 3 is an enlarged fragmentary interior view of a portion of a coupling housing incorporating a modification of the invention;
FIGS. 4, 5 and 6 are similar views incorporating further modifications of the invention;
FIG. 7 is an enlarged fragmentary interior view of one end of one of the coupling housings as viewed in FIG. 2;
FIG. 8 is a vertical section thereof taken on lines 8—8 of FIG. 7 and looking in the direction of the arrows;
FIGS. 9 and 10 are fragmentary elevational sections of pipe to be joined showing the application of coupling housings in accordance with the invention thereto;
FIGURE 11 is an enlarged longitudinal vertical section of a coupling housing in accordance with a further modification of the invention.
FIG. 12 is a section taken on line 12—12 of FIG. 11 and looking in the direction of the arrows; and
FIG. 13 is an enlarged fragmentary view of an end portion of the housing of FIG. 11 as viewed from the underside thereof.

In the illustrative embodiment of the invention of FIG. 1, the pipe coupling generally indicated at 1 is shown as made up of two identical coupling housings 2, secured together by suitable bolts 3 extending through the identical bolt pads 4, one of which extends out from each end of each semi-circular housing 2. For the coupling of pipes or tubing in the dimension ranges normally encountered, a complete coupling would normally be made up of two such identical half housings. For larger sized pipe or tubing, however, the number of housings can be increased with each one forming a smaller segment of the circle but with all together making up a complete circle. Thus the showing of a complete coupling made out of only two sections is to be understood as being for illustrative and not for limiting purposes.

Since the coupling housings are identical, only one will be described in detail and the same reference characters will be applied to common parts throughout the various modifications. Thus the housing 2, as shown in FIG. 2, is a semi-annulus which provides an interior gasket receiving groove 5 bordered by a cylindrical base portion 6 and side members 7. The side members 7 terminate in laterally extending faces 8. From those faces, ribs, or key sections, 9 extend up farther. This extent is of a height and width for proper reception, usually with a moderate amount of clearance, in the annular grooves formed in the exterior of the pipes to be joined.

The key sections in accordance with the invention, instead of continuing in their full width for the whole of the semi circle, are provided at each of their ends with "lead in" portions 10 for facilitating the introduction of the key sections into the pipe grooves. In the preferred form of FIGS. 2, 7 and 8, the lead in sections 10 are shown as being formed by chamfering the ends of the key sections outwardly from the end faces 11 thereof on both sides thereof at 12 and 13. The chamfer here is seen to be at a double angle with one angular component inclining outwardly from the end 11 in a direction inwardly of the key section, while the other angular component provides an incline inwardly from the base of the key section at the surface 8 to its outer edge face 14.

Another factor of the lead in section to be taken into consideration is the angular extension of it from the end face 11 to the position where the chamfer meets the side faces of the key sections 9, as seen at 15. Here, of course, the diameter of the pipe to be coupled and consequently the size of the coupling housings to effect the coupling is a consideration, for the function of the key sections is to hold the pipes in coupled relationship as against the action of the pressure within the pipe to force them apart. The strength of the key sections, however, has been found not to be particularly affected by a reasonable amount of chamfering of the ends. Thus, though a range of from 5°–45° of arc of a semi-circular coupling housing to be subtended by the chamfered portion appears to be reasonable, the presently preferred arc is one of approximately 25°. Looking at this in another way, a 25° chamfer is hardly as great as it sounds, for on a 2 inch diameter coupling a chamfer of one-half inch in length subtends an arc of 28°. Where a housing on a 10 inch diameter has a chamfer extending for an inch and a half along the key section the arc subtended is only 18°.

To complete the description of the half housings in the preferred form, it will be seen that the bolt pads 4 extending out from each end thereof are provided with diametrically extending surfaces 16 for engagement with comparable surfaces on the other half housings when the housings are brought together to complete the coupling. Also, the intermediate parts 17 of the bolt pads are provided with elliptical, or other non circular openings 18 therethrough, for the reception of similarly shaped bolt shanks to prevent rotation of the clamping bolts.

In the modification of FIG. 3 the structure as shown in the preferred form remains the same with the exception of that of the lead in portions. Here the lead in portions 25, instead of including chamfers on both sides of the key section as in the preferred form, merely has a chamfer 26 on the inner side of the key section 9. As in the preferred form, however, this chamfer is at a double angle inclining outwardly of the body of the key section and upwardly from the surface 8. Again, the angle subtended by the lead in portion may vary throughout a considerable range, as already discussed.

In the FIG. 4 form the chamfer is again shown as being on one side of the key section, providing a lead in portion 28. The difference here is that the chamfer 29 is concave and being at a double angle accordingly forms a conical section. Conversely, in FIG. 5, the lead in section 30 is formed by a convexly curved chamfer 31 which, accordingly, provides a convexly curved conical section.

In the FIG. 6 modification, lead in section 32 is provided by chamfering the key section 9 on its inner side outwardly from the end 11 at a single angle. Thus two separate surfaces result. The inclined surface 33 merely extends outwardly from the end 11 along the key section 9 to reach the inner surface thereof at the position 24. The other surface is the bottom one 35, concentric with the face surface 14 of the key section.

In the FIGS. 9 and 10 the attempt has been made to illustrate the manner in which the lead in section serves to perform several of its functions. There, sections of two pipe ends 40 and 41 are shown having identical grooves 42 therein, each of such grooves has a base 43 and side walls 44 and 45. In FIG. 9 the ends of the pipes 46 and 47 are shown as spaced a small distance apart. Also, a solid gasket 48 is shown as bridging over that space and being seated on the gasket engaging surfaces 49 of the pipes. This figure also illustrates the manner in which the lead in sections of the preferred form of the invention act to draw the pipe ends together and also seat the key sections of the coupling housing in the pipe grooves in spite of the presence of the gasket 48.

The double chamfer of the preferred form with the sides 12 and 13 is shown as being used with the sides 13 engaging the side walls 44 of the grooves 42. In the FIG. 9 showing the lead in sections are not yet seated all the way down into the grooves.

In the FIG. 10 showing, however, the seating of the key sections of the coupling housings in the grooves has been completed, so that the ends 46 and 47 of the pipes have been drawn together and the gasket 48 is fully encompassed within the gasket groove 5. In this position, then, the coupling housings have been brought home and the bolts can be applied to complete the joint.

In the modification of FIGS. 11–13 the structure of the coupling housing, with the exception of that of the key section, is the same as that of the previous forms. Thus the common parts of the basic structure carry the same reference characters and repetition of the description thereof is not needed. In this embodiment the whole of the key section differs somewhat from the key section 9 of the basic form and is, accordingly, given the reference character 59. The principal difference over the key sections 9 is that the inner faces of the key sections 59 are formed with a radial portion and with a chamfered portion which latter extends throughout a major portion of the length of the key section. The radial portion 60 extends upwardly from the lateral surface 8 for one-half of the distance between that surface and the free edge face 61 of the key section or, in other words, for one half the height of the key section. For the other half of that height the inner face is inclined outwardly as shown at 62 at a 45° angle with respect to the radius. The incline 62 extends throughout the major portion of the arc of each housing. The provision of the incline 62 reduces the width of the free end face 61 as against the comparable portion 14 of the previous forms, but still leaves ample material for satisfactory engagement with the key slots in the pipes.

In addition to the 45° peripheral chamfer of the portion 62, the housings of FIGS. 11–13 also have lead in sections at each end of each of the key sections. These, as shown at 63, are comparable to the lead in sections shown at 26 in FIG. 3. More particularly they are at an angle of 45° from the surfaces 8 and they extend outwardly from the ends 11 for 15° of the arc of the housings from the ends thereof. In the course of their extent they merge with the chamfered surface 62 so in a sense continue a lead in effect all the way around the housing.

The provision of the chamfer 62 on the key sections assists in the drawing of the pipe ends together when that is desired, whether to render the joint rigid or merely to bring the pipe ends closer together. Furthermore, the application of coupling housings is facilitated where a gasket is employed within the housings that need to be compressed onto the circumferential surface of the pipe, or where the gasket is used for the sealing and protecting of the pipe ends by compression of it between the pipe ends.

Through the 45° chamfer for the surface 62 and the extension thereof throughout one-half the height of the key section are presently preferred, it is, of course, to be understood that the invention is not limited thereby. Furthermore, the 45° angle of the chamfer 63 extending through an arc of 15° is presently preferred in combination with the surface 62 for coupling housings of moderate size. It is again to be understood that the invention is not to be considered as being limited thereby.

While in the foregoing the presently preferred and several modifications of the invention have been described, it is of course to be understood that the invention is not limited thereby, but since variations and modifications of such construction would suggest themselves to those skilled in the art without departing from the spirit and scope of the invention, the foregoing description and comparable showing in the drawing are to be considered as illustrative and not in a limiting sense.

Having described my invention, what I claim as new and desire to secure by Letters Patent is:

A pipe joint comprising a pair of sections of pipe in end to end relationship, said pipe sections being formed with annular grooves extending into the material thereof from the exterior adjacent their ends, and a coupling housing applied over said ends and having key sections engaging said grooves for securing said pipe sections in assembled relationship, said grooves being formed with side walls and a substantially cylindrical bottom, said side walls of said grooves on the side thereof toward the adjacent pipe ends providing engaging surfaces lying in planes extending radially with respect to the axis of the pipe, said coupling housing being formed as a cylindrical member made up of arcuate portions of said cylinder suitably clamped together, said coupling housing being formed internally with an intermediate radially outwardly extending channel for the reception of a coupling gasket, a coupling gasket received in said channel and overlying the opposed ends of said pipes and said key sections being positioned at the outer sides of said channel, said key sections being formed as radially inwardly extending key ribs engaged with said pipe grooves when said arcuate portions are secured together, the portions of said key sections encompassed by each of said arcuate portions being rectangular in cross section throughout substantially the whole of the lengths thereof, each of said key sections providing a radially extending inner side surface, one for engagement with each of said engaging surfaces of said grooves to hold said pipe ends in assembled relationship, each of said portions of said key sections closely adjacent the ends thereof being provided with lead-in means, said lead-in means formed as short surface portions on the inner sides of said key section portions commencing at said radially extending side surfaces and inclining outwardly in both radial and axial directions with respect to said radially extending inner side surfaces of said key sections, said short surface portions commencing a small distance from the free ends of said key section portions and terminating at said free ends whereby as said coupling housing is brought into position over said pipes and said portions of said housing are drawn together to complete the cylinder thereof, said lead-in means will engage said engaging side surfaces of said grooves and will draw said pipe ends toward each other as said lead-in means are forced down into said grooves until said radial side surfaces of said key sections are brought into holding engagement with said engaging surfaces of said grooves.

References Cited in the file of this patent

UNITED STATES PATENTS

| | | |
|---|---|---|
| 1,541,601 | Tribe | June 9, 1925 |
| 2,028,182 | Barnickol | Jan. 21, 1936 |
| 2,821,415 | Race | Jan. 28, 1958 |

FOREIGN PATENTS

| | | |
|---|---|---|
| 167,265 | Great Britain | Aug. 3, 1921 |